United States Patent [19]

Arakawa et al.

[11] Patent Number: 4,770,830

[45] Date of Patent: Sep. 13, 1988

[54] PROCESS FOR PREPARATION OF HIGH α-TYPE SILICON NITRIDE POWDER

[75] Inventors: Toshihiko Arakawa; Kuniyoshi Ueda, both of Yokohama; Naomichi Sakai, Ayase; Takaaki Tsukidate, Hino, all of Japan

[73] Assignee: Toyo Soda Manufacturing Co., Ltd., Japan

[21] Appl. No.: 943,624

[22] Filed: Dec. 18, 1986

[30] Foreign Application Priority Data

Dec. 23, 1985 [JP] Japan .................. 60-287960

[51] Int. Cl.$^4$ ................................ C01B 33/06
[52] U.S. Cl. ........................... 264/66; 423/344
[58] Field of Search .................... 423/344; 264/66

[56] References Cited

U.S. PATENT DOCUMENTS 3,959,446  5/1976  Mazdiyasni et al. ............. 423/344
4,517,168  5/1985  Kawahito et al.

FOREIGN PATENT DOCUMENTS 58-55315  4/1983  Japan .
59-21507  2/1984  Japan .......................... 264/344

Primary Examiner—James Derrington
Attorney, Agent, or Firm—Brumbaugh, Graves, Donohue & Raymond

[57] ABSTRACT

Disclosed is a process for the preparation of high α-type silicon nitride powder, wherein a nitrogen-containing silane compound and/or amorphous silicon nitride is crystallized to form crystalline silicon nitride. In this process, crystalline silicon nitride having a particle size not larger than 0.05 μm is incorporated in an amount of at least 0.1% by weight into the nitrogen-containing silane compound and/or amorphous silicon nitride, the mixture is formed into a power or molded body having a powder bulk density of at least 0.1 g/cm$^3$ as silicon, and the powder or molded body is heated to 1,350° to 1,700° C. while controlling the temperature-elevating rate to at least 15° C./min throughout the temperature range of from 1,200° to 1,350° C. The resulting high α-type silicon nitride is composed of a fine granular crystal and the does not contain a needle crystal or columnar crystal.

2 Claims, No Drawings

PROCESS FOR PREPARATION OF HIGH α-TYPE SILICON NITRIDE POWDER

BACKGROUND OF THE INVENTION (1) Field of the Invention

The present invention relates to a process for the preparation of a fine silicon nitride powder suitable for the production of a silicon nitride sintered body valuable as a high-temperature structural material.

(2) Description of the Related Art

High-purity α-type silicon nitride can be easily obtained by thermal decomposition of silicon imide, but most of powdery products have a shape of a needle crystal or columnar crystal, and therefore, if such a powdery product is used as the sintering material, the density of the molded body is very low, and the prior art has a problem such that a sintered body having a high cannot be obtained.

SUMMARY OF THE INVENTION

In view of the foregoing, it is a primary object of the present invention to provide a process for the preparation of high-purity α-type silicon nitride powder composed of a fine granular crystal, which does not contain a needle crystal or columnar crystal having bad influences on the properties of silicon nitride as the starting material for sintering.

In accordance with the present invention, there is provided a process for the preparation of high α-type silicon nitride powder, which comprises crystallizing a nitrogen-containing silane compound and/or amorphous silicon nitride to form crystalline silicon nitride, characterized in that crystalline silicon nitride having a particle size not larger than 0.05 μm is incorporated in an amount of at least 0.1% by weight into the nitrogen-containing silane compound and/or amorphous silicon nitride, the mixture is formed into a powder or molded body having a powder bulk density of at least 0.1 g/cm$^3$ as silicon, and the powder or molded body is heated to 1,350° to 1,700° C. while controlling the temperature-elevating rate to at least 15° C./min througho the temperature range of from 1,200° to 1,350° C.

DESCRIPTION OF THE PREFERRED EMBODIMENTS

As the nitrogen-containing silane compound, there can be mentioned Si(NH)$_2$ silicon diimide obtained by washing a mixture of silicon diimide Si(NH)$_2$ and ammonium chloride, which is a reaction product of a silicon halide and ammonia, with liquid NH$_3$, and Si$_2$N$_3$H which is a decomposition product obtained by heating ammonium chloride in nitrogen or ammonia. It is especially preferred that the halogen content in the nitrogen-containing silane compound and/or amorphous silicon nitride be lower than 1% by weight.

According to the present invention, crystalline silicon nitride having a particle size not larger than 0.05 μm is incorporated in an amount of at least 0.1% by weight into the silicon-containing silane compound and/or amorphous silicon nitride, the resulting mixture is formed into a powder or molded body having a powder bulk density of at least 0.1 g/cm$^3$ as silicon, and the powder or molded body is heated to 1,350° to 1,700° C. while controlling the temperature-elevating rate to at least 15° C./min throughout the temperature range of from 1,200° to 1,350° C. Even if crystallization is carried out under the above-mentioned sintering conditions without incorporation of crystalline silicon nitride having a particle size not larger than 0.05 μm in an amount of at least 0.1% by weight, fine powder can be obtained, but the ratio of formation of β-type silicon nitride is increased and high α-type silicon nitride powder cannot be obtained. Preferably, the amount of crystalline silicon nitride having a particle size not larger than 0.05 μm is in the range of from 0.1 to 20% by weight.

In the present invention, the mixture of the nitrogen-containing silane compound and/or amorphous silicon nitride and at least 0.1% by weight of crystalline silicon nitride having a particle size not larger than 0.05 μm, must be formed into a powder or molded body having a powder bulk density of at least 0.1 g/cm$^3$ as silicon. If a powder or molded body having a powder bulk density lower than 0.1 g/cm$^3$ is used, a needle crystal or columnar crystal is inevitably formed and good results cannot be obtained. Preferably, the powder bulk density is in the range of from 0.1 to 0.5 g/cm$^3$ as silicon.

As the crystalline silicon nitride to be incorporated in the nitrogen-containing silane compound and/or amorphous silicon nitride, a powder having a particle size not larger than 0.05 μm and composed solely of crystalline silicon nitride is preferably used. However, it is difficult to obtain a powder having a particle size not larger than 0.05 μm and composed solely of crystalline silicon nitride according to an ordinary method, and in this case, a method may be adopted in which the crystalline silicon nitride powder is added to the nitrogen-containing silane compound and/or amorphous silicon nitride without separating powder having a particle size exceeding 0.05 μm, so that the content of crystalline silicon nitride having a particle size not larger than 0.05 μm in the mixture is at least 0.1% by weight.

In the present invention, it is the above-mentioned powder or molded body must be heated to 1,350° to 1,700° C. while controlling the temperature-elevating rate to at least 15° C./min throughout the temperature range of from 1,200° to 1,350° C. If the temperature-elevating rate is lower than 15° C./min throughout the temperature range of from 1,200° to 1,350° C., the growth of particles cannot be controlled at the crystallizing step and a fine powder cannot be obtained. At temperature lower than 1,200° C., the temperature-elevating rate need not be controlled, because crystallization of the nitrogen-containing silane compound or amorphous silicon nitride does not occur at temperatures lower than 1,200° C. Furthermore, the temperature elevating rate need not be controlled at temperatures higher than 1,350° ° C. because the growth of particles by crystallization does not occur at temperatures higher than 1,350° C. The heating temperature should be in the range of from 1,350 to 1,700° C. If the heating temperature is lower than 1,350° C., crystallization of the nitrogen-containing silane compound and/or amorphous silicon nitride is incomplete and amorphous silicon nitride is left. On the other had, if the heating temperature exceeds 1,700° C., decomposition of the formed silicon nitride powder occurs.

If the mixture formed by incorporating crystalline silicon nitride having a particle size not larger than 0.05 μm into the nitrogen-containing silane compound and/or amorphous silicon nitride is crystallized, high α-type silicon nitride powder described below is formed. Although the reason for this is not clear, it is believed that if crystalline silicon nitride is added, crystallization is advanced at a temperature lower than the crystallization temperature observed in the case where crystalline silicon nitride is not added and since elevation of the temperature by the reaction heat by crystallization is controlled, formation of β-type silicon nitride of a high-temperature type is inhibited.

In the preparation process of the present invention, the most preferable atmosphere for carrying out thermal decomposition at a temperature of 1,200° C. to 1,700° C. is a nitrogen atmosphere. Other atmospheres may be adopted. However, in an inert gas or in vacuo, a part of silicon nitride is decomposed to silicon, and in a hydrogen or halogen gas, formation of a needle crystal of silicon nitride is promoted. Accordingly, these atmospheres are not preferred.

The present invention will be described in detail by the following examples.

EXAMPLES 1 THROUGH 6 AND COMPARATIVE EXAMPLES 1 THROUGH 3

A mixture of silicon diimide and ammonium chloride, which was a reaction product of a silicon halide and ammonia, was calcined at 1,000° C. for 2 hours in an ammonia atmosphere to obtain a white amorphous powder. From the analysis values of Si, N and H of the formed powder, it was found that the composition of the formed powder was very close to $Si_2N_3H$ and the chlorine content was 0.5% by weight.

A powder (hereinafter referred to as "powder A") of crystalline silicon nitride (oxygen content=1.5% by weight, α-phase content=90%, average particle size=0.3 μm, specific surface area=20 m$^2$/g) containing 10% by weight of a powder having a particle size not larger than 0.05 μm was incorporated in an amount shown in Table 1 with the above-mentioned powder, and the powders were mixed for 1 hour in a nylon ball mill. The mixture was molder under a molding pressure of 200 kg/cm$^2$ by a mold press having a diameter of 25 mm to form a molded body having a bulk density of 0.18 g/cm$^3$ as silicon. The molded body was maintained under conditions shown in Table 1 for 1 hour to obtain a silicon nitride powder. The α-phase content and average particle size of the formed powder were examined. The obtained results are shown in Table 1.

EXAMPLES 7 THROUGH 9 AND COMPARATIVE EXAMPLE 4

A mixture of silicon diimide and ammonium chloride, which was a reaction product of a silicon halide and ammonia, was washed with liquid ammonia to remove ammonium chloride formed as the by-product and isolate Si(NH)$_2$. This Si(NH)$_2$ was calcined at 1,100° C. for 1 hour in a nitrogen atmosphere to obtained a white amorphous silicon nitride powder. The chlorine content in the powder was 0.8% by weight.

The thus-obtained power was mixed with the powder A or a powder (hereinafter referred to as "powder B") of crystalline silicon nitride (oxygen content=2.0% by weight, α-phase content=90%, average particle size=0.1 μm, specific surface area=25 m$^2$/g) containing 80% of a powder having a particle size not larger than 0.05 μm in an amount shown in Table 1, and the powders were mixed for 1 hour in a vibrating ball mill. The obtained powdery mixture was molded by a tablet machine and inserted in a furnace maintained at 1,500° C. in a nitrogen atmosphere, and the powdery mixture was held in this furnace for 1 hour to obtain a silicon nitride powder. The obtained results are shown in Table 1.

TABLE 1

|  | Powder added | Amount of powder added (wt. %) | Amount of powder having size not larger than 0.05 μm (wt. %) | Temperature elevating rate (°C./min) | Sintering temperature (°C.) | α-phase content (wt. %) | Particle size (μm) |
|---|---|---|---|---|---|---|---|
| Example 1 | A | 1 | 0.1 | 20 | 1500 | 95 | Below 0.2 |
| Example 2 | A | 5 | 0.5 | 20 | 1400 | 96 | Below 0.2 |
| Example 3 | A | 5 | 0.5 | 20 | 1500 | 96 | Below 0.2 |
| Example 4 | A | 5 | 0.5 | 20 | 1700 | 96 | Below 0.2 |
| Example 5 | A | 5 | 0.5 | 15 | 1500 | 96 | Below 0.2 |
| Example 6 | A | 5 | 0.5 | 40 | 1500 | 95 | Below 0.2 |
| Example 7 | A | 1 | 0.1 | Above 50 | 1500 | 95 | Below 0.2 |
| Example 8 | A | 20 | 2.0 | Above 50 | 1500 | 96 | Below 0.2 |
| Example 9 | B | 1 | 0.8 | Above 50 | 1500 | 95 | Below 0.2 |
| Comparative Example 1 | — | 0 | 0 | 20 | 1500 | 85 | Below 0.2 |
| Comparative Example 2 | A | 0.5 | 0.05 | 20 | 1500 | 90 | Below 0.2 |
| Comparative Example 3 | A | 5 | 0.5 | 4 | 1500 | 99 | 0.3 |
| Comparative Example 4 | A | 0.5 | 0.05 | Above 50 | 1500 | 89 | Below 0.2 |

We claim:

1. A process for the preparation of high α-type silicon nitride powder, which comprises crystallizing at least one compound selected from the group consisting of a nitrogen-containing silane compound and amorphous silicon nitride to form crystalline silicon nitride, wherein crystalline silicon nitride having a particle size not larger than 0.05 μm is incorporated in an amount of at least 0.1% by weight into said at least one compound to be crystallized, the mixture is formed into a powder or molded body having a powder bulk density of at least 0.1 g/cm$^3$ as silicon and the powder or molded body is heated to 1,400° C. to 1,700° C. in a nitrogen atmosphere while controlling the temperature-elevating rate to at least 15° C./min throughout the temperature range of from 1,200° to 1,350° C.

2. A process according to claim 1 wherein said compound to be crystallized contains lower than 1% by weight of halogen.

* * * * *